United States Patent
Miranda et al.

(10) Patent No.: US 11,416,635 B1
(45) Date of Patent: Aug. 16, 2022

(54) PSEUDONYMOUS BROWSING MODE

(71) Applicant: Wells Fargo Bank, N.A., San Francisco, CA (US)

(72) Inventors: Darius A. Miranda, San Francisco, CA (US); Rajiv Ranjan, Fremont, CA (US); Uma Meyyappan, Freemont, CA (US); Dennis E. Montenegro, Concord, CA (US); Pankaj Parekh, San Francisco, CA (US); Chris Theodore Kalaboukis, San Jose, CA (US); Joon Maeng, Newcastle, WA (US); Ramanathan Ramanathan, Bellevue, WA (US); Abhijit Rao, Irvine, CA (US); Abhijit Shetti, Pleasanton, CA (US); Rameshchandra Bhaskar Ketharaju, Hyderabad (IN); Chandramouli Subramanian, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 25 days.

(21) Appl. No.: 16/926,220

(22) Filed: Jul. 10, 2020

(51) Int. Cl.
*G06F 21/00* (2013.01)
*G06F 21/62* (2013.01)

(52) U.S. Cl.
CPC ...... *G06F 21/6254* (2013.01); *G06F 21/6263* (2013.01)

(58) Field of Classification Search
CPC .................... G06F 21/6263; G06F 21/6254
See application file for complete search history.

(56) References Cited

U.S. PATENT DOCUMENTS

| | | | |
|---|---|---|---|
| 7,992,195 B2 | 8/2011 | Pfitzmann et al. | |
| 9,591,097 B2 | 3/2017 | Toffa | |
| 9,754,128 B2 | 9/2017 | Golic | |
| 9,788,197 B2 | 10/2017 | Yang et al. | |
| 2013/0097664 A1 | 4/2013 | Herz et al. | |
| 2014/0325680 A1* | 10/2014 | Yang | G06F 21/6218 726/28 |
| 2015/0143531 A1* | 5/2015 | Gjonej | G06F 21/6254 726/26 |
| 2015/0143544 A1* | 5/2015 | Lu | H04L 63/10 726/29 |
| 2017/0357827 A1* | 12/2017 | Shoa | H04L 63/08 |
| 2018/0060411 A1 | 3/2018 | Kanuri et al. | |

FOREIGN PATENT DOCUMENTS

WO    WO-2010045675 A1    4/2010

* cited by examiner

*Primary Examiner* — Ghazal B Shehni
(74) *Attorney, Agent, or Firm* — Schwegman Lundberg & Woessner, P.A.

(57) ABSTRACT

Various examples are directed to computer-implemented systems and methods for providing a pseudonymous browsing mode. A method includes receiving, by a processor of a computer, input from a user requesting a level of anonymity for a session on an application or website, where the level of anonymity is between open browsing and completely incognito browsing. The processor programs an avatar configured to provide the level of anonymity to an identity of the user and data generated by the user based on the received input. The processor uses the avatar to control an amount of data shared by the user with the application or website to provide the level of anonymity to an identity of the user and data generated by the user.

20 Claims, 5 Drawing Sheets

PSEUDONYMOUS BROWSING MODE

TECHNICAL FIELD

Embodiments described herein generally relate to a customizable browser or session and, for example and without limitation, to systems and methods for a pseudonymous browsing mode.

BACKGROUND

A user of online services may encounter situations in which it would be desirable to share more or less data generated or used by the user.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

A user of online services may encounter situations in which it would be desirable to share more or less data generated or used by the user. The user would also benefit from being able to customize the amount of data shared for each website or application visited by the user. The present subject matter provides a system and method for providing a pseudonymous browsing mode. A customizable browser or session (e.g., for an application or website) is provided that allows for a pseudonymous mode—with privacy settings between open browsing and completely incognito. A user may set up different avatars (profiles) having different levels of data sharing. In one example, an open avatar is created that shares all data, accepts all cookies, etc. In another example, an incognito avatar is created that stores no data, etc., such as a full virtual private network (VPN) incognito browser that shares no data. One example of a pseudonymous (or in-between open and incognito) avatar includes a first avatar where browsing history is saved but all accounts, passwords, and logins are not saved and are not logged in (e.g., log user out of all accounts). Another example of a pseudonymous avatar includes a second avatar where browsing history is not saved, but logins are allowed to remain logged in. A further example of a pseudonymous avatar includes a third avatar where logins and tracking are allowed for certain trusted websites, but not for others (e.g., bank can be logged in, but not social media), or the like. The present subject matter provides separate avatars for different data sharing, filtering or masking to allow some data to be stored to a user's profile (or shared to the user's profile), but filtering out some other types of data. Thus, the present subject matter provides for avatars/profiles with different privacy settings, including open, incognito, and pseudonymous (in-between open and incognito) levels of privacy.

Figure 1:
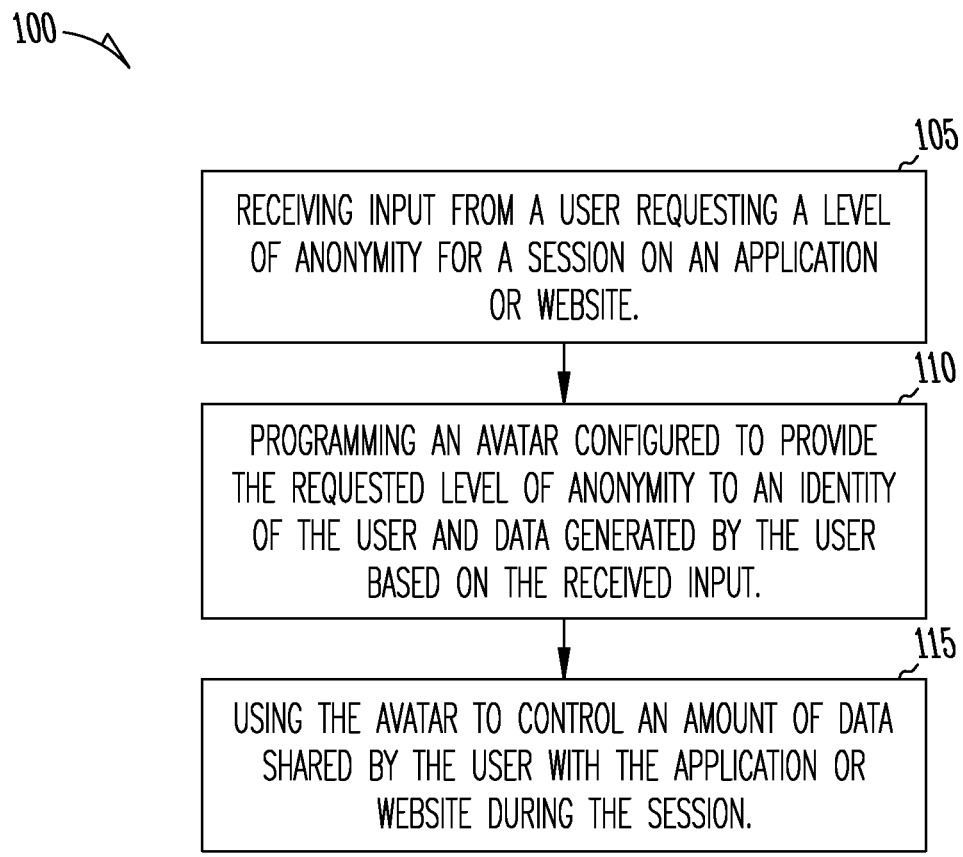
FIG. 1 illustrates an example embodiment of a method for providing a pseudonymous browsing mode.

FIG. 1 illustrates an example embodiment of a system for providing a pseudonymous browsing mode. The method 100 includes receiving, by a processor of a computer, input from a user requesting a level of anonymity for a session on an application or website, at operation 105. In various embodiments, the requested level of anonymity is between open browsing and completely incognito browsing. In various embodiments, the requested level of anonymity is closer to open browsing but partially incognito. In various embodiments, the requested level of anonymity is closer to incognito browsing but partially open. In some embodiments, the requested level of anonymity is open browsing. In some embodiments, the requested level of anonymity is completely incognito browsing. In these examples, the avatars provide the anonymity. In some examples, a classification of avatars is used including a preconfigured avatar for specific interactions. In various examples, an avatar may be used for a single instance and then may access dynamic open synthetic data that is closest to the user to create an avatar for interaction, where this avatar could be available for reuse in future. At operation 110, the processor programs an avatar configured to provide the requested level of anonymity to an identity of the user (such as previously-generated data identifying the user) and data generated by the user based on the received input. At operation 115, the processor uses the avatar to control an amount of data shared by the user with the application or website, to provide the requested level of anonymity to an identity of the user and data generated by the user. In the case of a restored browser session, the user may be prompted upon restoring the session to determine if the user would like to reuse the previously created avatar, and the avatar may be stored for this purpose. In other embodiments, an avatar may be erased if the corresponding browser session is ended. As discussed with respect to FIG. 5 below, a key may be generated by a component 530 to provide user-specific device-level access for reuse of avatars, in various embodiments.

According to various embodiments, programming an avatar includes programming a first avatar for a first application or website and programming a second avatar for a second application or website. Programming an avatar may also include programming a first avatar for a first session on a first application or website and programming a second avatar for a second session on the first application or website, in various embodiments. In some embodiments, multiple tabs within an open browser are considered part of a single session. In other embodiments, multiple tabs within an open browser are considered part of multiple sessions, with each tab treated as a single session. The first avatar and the second avatar provide the same level of anonymity to the identity of the user and data generated by the user, in some embodiments. The first avatar and the second avatar provide a different level of anonymity to the identity of the user and data generated by the user, in other embodiments. According to some embodiments, the requested level of anonymity of the avatar provides for sharing or saving browsing history of the user, but not sharing or saving passwords or logins with the application or website. The avatar provides for not sharing or saving browsing history of the user, but sharing or saving passwords or logins with the application or website, in some embodiments. In further embodiments, the avatar provides for sharing or saving browsing history of the user, and sharing or saving passwords or logins with the application or website. The avatar provides for not sharing or saving browsing history of the user, and not sharing or saving passwords or logins with the application or website, in various embodiments.

In various embodiments, a user may program the avatar to control which sites or applications can obtain what level of data. The avatar is customizable on a privacy continuum from open to incognito, in various embodiments. The user may control the privacy settings of the avatar (configure the avatar) before using the application or website, in some embodiments. In some embodiments, the user may modify the privacy settings of the avatar "on the fly", or while using the application or website. For example, the user may switch to completely incognito browsing when accessing an account on a financial institution website. Avatars may have different profiles and different settings for different applications or websites, in various embodiments. The present subject matter may make a browser more intelligent by adding protection of user data on top of the existing website protection, in various embodiments. In various embodiments, the avatar provides for browser behavior based on user preference.

The avatar includes a profile, or digital certificate, on the client side that is adaptive such that the browser selects and saves the specific profile based on which application or website the user is interfacing, in various embodiments. The avatar determines whether cookies of the user get stored during interaction with the application or website, in various embodiments. In some embodiments, the avatar protects user configurations and provides confidentiality to the user during one or more browsing sessions. The present subject matter provides the ability to switch between levels of privacy for browsing with respect to specific data, as well as with respect to specific sites or applications. In some embodiments, the avatar can track what data of a user is exposed, to provide warnings and/or to identify potential monetization opportunities.

In various embodiments, the avatar uses artificial intelligence (AI) to determine what to be shared or restricted based on user input. For example, the avatar may be trained to detect patterns in user preferences with respect to anonymity for specific types of websites or interactions. A plurality of avatars may be used for each application or website, in various embodiments. For example, on a financial institution website a user may prefer to increase anonymity when accessing certain account data. A single avatar may be used for each application or website, in various embodiments. In some embodiments, the avatar is configured to run on an external server, user device, and/or other computer processor in communication with the user device. The avatar resides on all user devices, in various embodiments.

Various embodiments of the present subject matter include a system for providing a pseudonymous browsing mode. The system includes a computing device comprising a processor and a data storage device in communication with the processor. The data storage device includes instructions thereon that, when executed by the processor, causes the processor to receive input from a user requesting a level of anonymity for a session on an application or website, wherein the requested level of anonymity is between open browsing and completely incognito browsing. An avatar is programmed and configured to provide the requested level of anonymity to an identity of the user and data generated by the user based on the received input. The avatar is used to control an amount of data shared by the user with the application or website to provide the requested (or selected or desired) level of anonymity to an identity of the user and data generated by the user.

According to some embodiments, the avatar provides for sharing or saving browsing history of the user, but not sharing or saving passwords or logins with the application or website. The avatar provides for not sharing or saving browsing history of the user, but sharing or saving passwords or logins with the application or website, in some embodiments. In further embodiments, the avatar provides for sharing or saving browsing history of the user, and sharing or saving passwords or logins with the application or website. The avatar provides for not sharing or saving browsing history of the user, and not sharing or saving passwords or logins with the application or website, in various embodiments.

In various embodiments, a non-transitory computer-readable storage medium is provided. The computer-readable storage medium includes instructions that when executed by computers, cause the computers to perform operations of receiving input from a user requesting a level of anonymity for a session on an application or website, wherein the requested level of anonymity is between open browsing and completely incognito browsing, and programming an avatar configured to provide the requested level of anonymity to an identity of the user and data generated by the user based on the received input. Further operations include using the avatar to control an amount of data shared by the user with the application or website to provide the requested level of anonymity to an identity of the user and data generated by the user.

According to various embodiments, the avatar is configured to be replicated on multiple devices used by the user. In some embodiments, the multiple devices may include a smartphone, a tablet, or a laptop. Other devices, including augmented reality (AR) or virtual reality (VR) devices, may be used without departing from the scope of the present subject matter.

Figure 2:
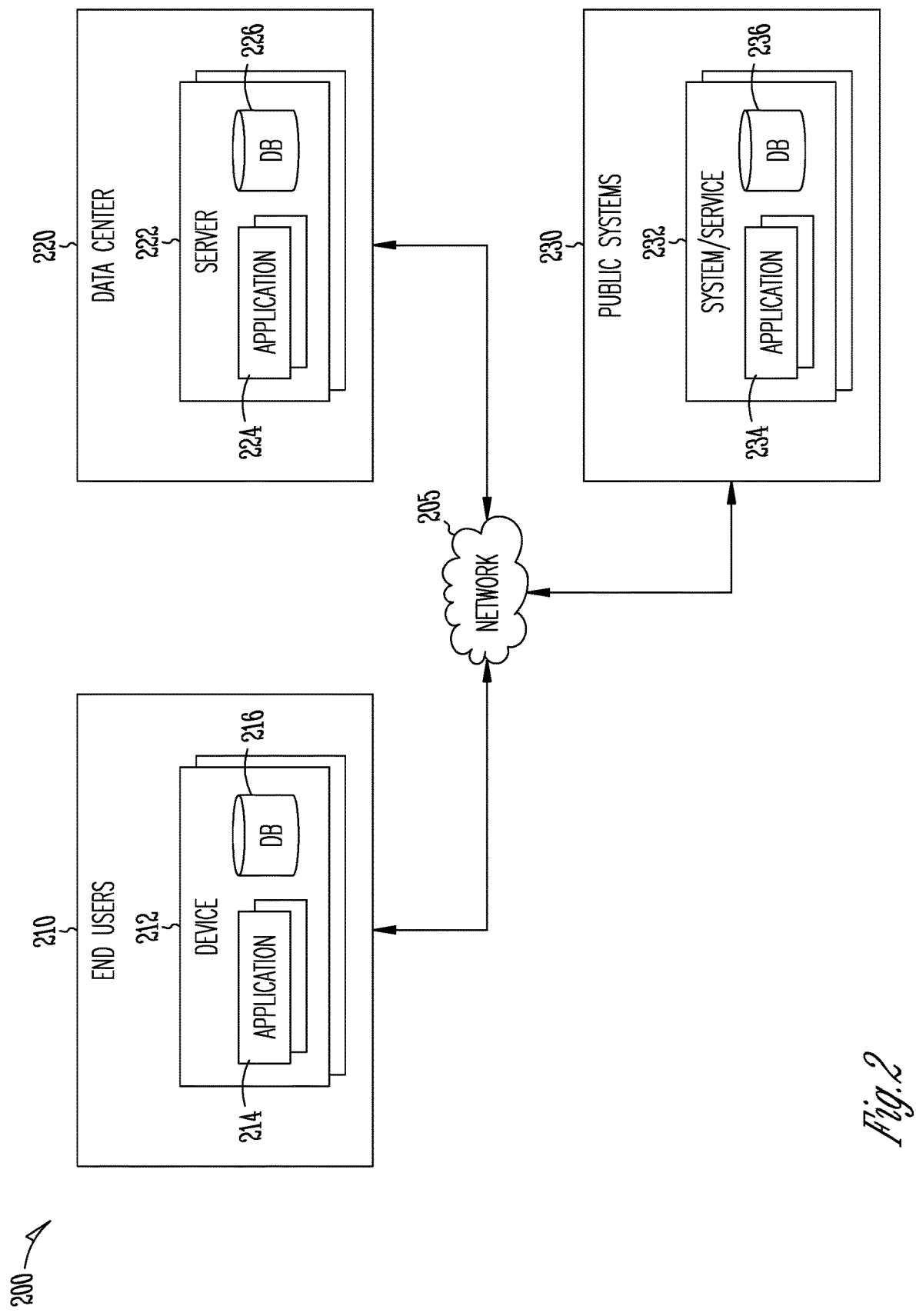
FIG. 2 illustrates an exemplary infrastructure for providing a pseudonymous browsing mode.

FIG. 2 illustrates an exemplary infrastructure for providing a pseudonymous browsing mode. The infrastructure may comprise a distributed system 200 that may include a client-server architecture or cloud computing system. Distributed system 200 may have one or more end users 210. An end user 210 may have various computing devices 212, which may be a machine 500 as described below. The end-user computing devices 212 may comprise applications 214 that are either designed to execute in a stand-alone manner, or interact with other applications 214 located on the device 212 or accessible via the network 205. These devices 212 may also comprise a data store 216 that holds data locally, the data being potentially accessible by the local applications 214 or by remote applications.

The system 200 may also include one or more data centers 220. A data center 220 may be a server 222 or the like associated with a business entity that an end user 210 may interact with. The business entity may be a computer service provider, as may be the case for a cloud services provider, or it may be a consumer product or service provider, such as a retailer. The data center 220 may comprise one or more applications 224 and databases 226 that are designed to interface with the applications 214 and databases 216 of end-user devices 212. Data centers 220 may represent facilities in different geographic locations where the servers 222 may be located. Each of the servers 222 may be in the form of a machine(s) 500.

The system 200 may also include publicly available systems 230 that comprise various systems or services 232, including applications 234 and their respective databases 236. Such applications 234 may include news and other information feeds, search engines, social media applications, and the like. The systems or services 232 may be provided as comprising a machine(s) 500.

The end-user devices 212, data center servers 222, and public systems or services 232 may be configured to connect with each other via the network 205, and access to the network by machines may be made via a common connection point or different connection points, e.g. a wireless connection point and a wired connection. Any combination of common or different connections points may be present, and any combination of wired and wireless connection points may be present as well. The network 205, end users 210, data centers 220, and public systems 230 may include network hardware such as routers, switches, load balancers and/or other network devices.

Other implementations of the system 200 are also possible. For example, devices other than the client devices 212 and servers 222 shown may be included in the system 200. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 222.

Figure 3:
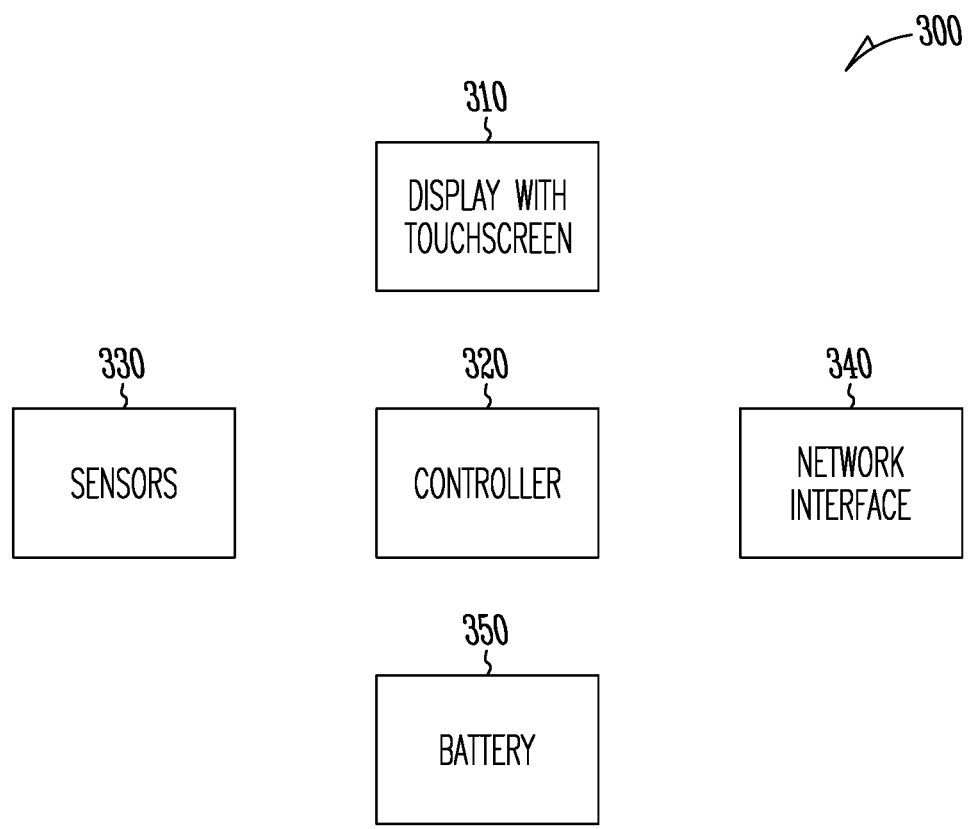
FIG. 3 illustrates an example embodiment of a computing device used by a user.

FIG. 3 illustrates an embodiment of computing device 300 used by a user. In the depicted embodiment, the computing device 300 includes a display with a touchscreen 310 interfaced with a controller or processor 320. The controller or processor 320 is electrically connected to one or more sensors 330, a network interface 340, and a battery 350 to supply power to the computing device 300, in various embodiments. The computing device 300 may be a personal computer or a mobile computing device such as smartphone, tablet computer, or other portable computing device. Exemplary mobile devices include the Apple iPhone and Samsung Galaxy smartphone. FIG. 3 is merely a non-limiting example of a computing device and many other devices may be used to facilitate the functionality described herein.

The network interface 340 may include an interface to a network such as Internet, LAN, Wi-Fi, home network, cellular network, NFC, and other types of networks, in various embodiments. The network interface 340 may include an interface to a local network. Exemplary local networks are a Local area network (LAN) and a Personal Area Network (PAN). The local network may use Bluetooth, Near Field Communication (NFC), Wi-Fi, ZigBee, or other wireless technology, in various embodiments.

Figure 4:
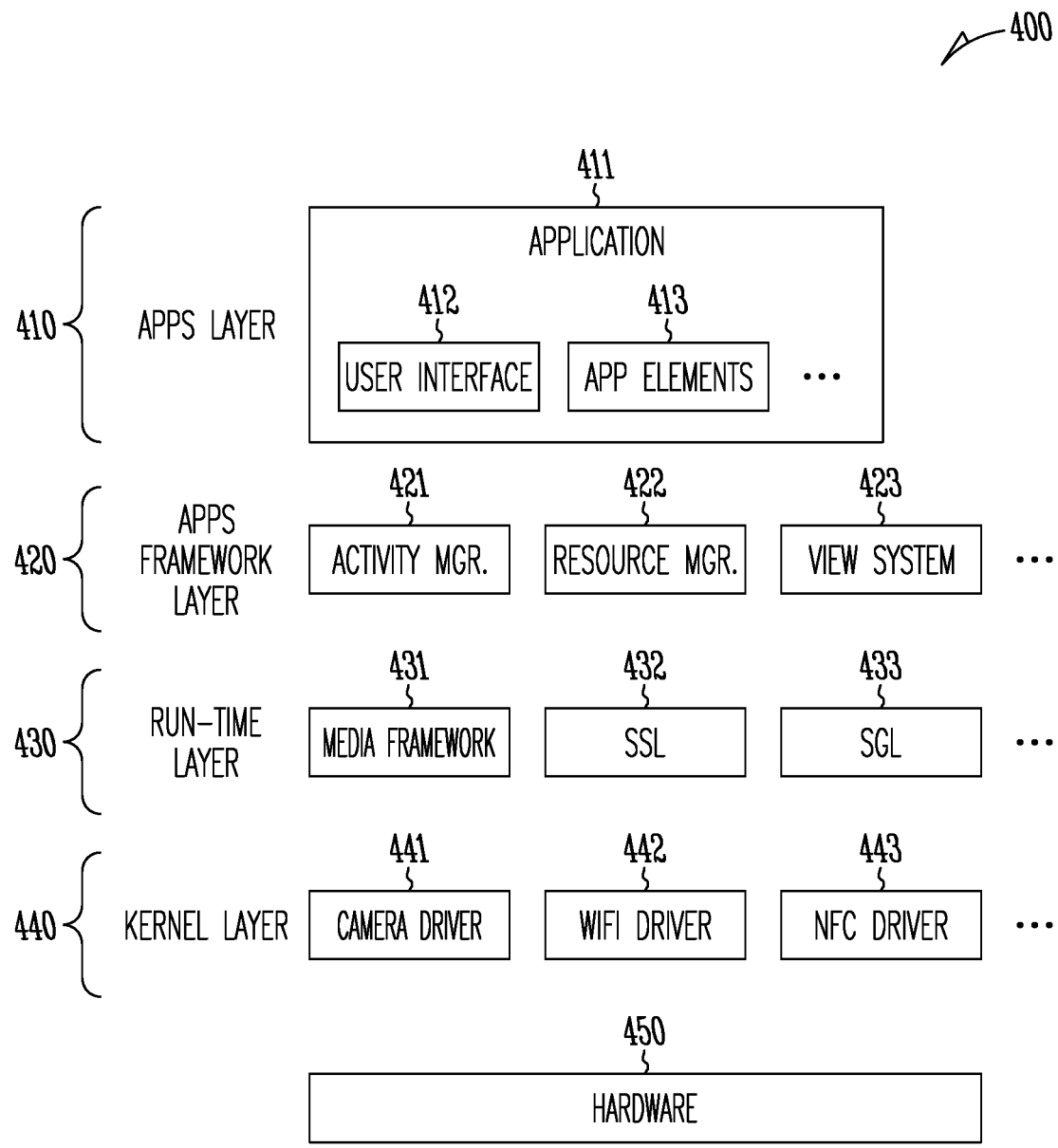
FIG. 4 illustrates an example embodiment of a computing device used for a pseudonymous browsing mode.

FIG. 4 illustrates an embodiment of a computing device 400 with a software application 411. In various embodiments, the computing device 400 includes personal computer or a mobile computing device such as a cellular telephone or smart phone. The depicted embodiment illustrates one example of software architecture executed on hardware 450, including one or more processors of the computing device 400. FIG. 4 is merely a non-limiting example of a software architecture and many other architectures may be implemented to facilitate the functionality described herein.

The representative hardware 450 comprises one or more processing units having associated executable instructions. Executable instructions represent the executable instructions of the software architecture, including implementation of the methods, modules, and components of the present subject matter. Hardware 450 also includes memory and/or storage modules, which also have executable instructions.

In the example architecture of FIG. 4, the software may be conceptualized as a stack of layers where each layer provides particular functionality. For example, the software may include layers such as an operating system, libraries, frameworks/middleware, applications and presentation layer. Other software architectures may include additional or different layers. The operating system may manage hardware resources and provide common services. The overall system may include, for example, a kernel layer 440, run-time layer 430, application framework layer 420 and application layer 410. The kernel layer 440 may act as an abstraction layer between the hardware and the other software layers. For example, the kernel layer 440 may be responsible for memory management, processor management (e.g., scheduling), component management, networking, security settings, and so on. The drivers may be responsible for controlling or interfacing with the underlying hardware. For instance, the drivers may include display drivers, camera drivers 441, Bluetooth® drivers, flash memory drivers, serial communication drivers (e.g., Universal Serial Bus (USB) drivers), Wi-Fi® drivers 442, near field communication (NFC) drivers 443, audio drivers, power management drivers, and so forth depending on the hardware configuration.

The run-time layer 430 may include a media framework 431, a secure sockets layer (SSL) 432 and a secure group layer (SGL) 433, in various embodiments. The application framework layer 420 may include an activity manager 421, a resource manager 422, and a view system application 423, in various embodiments. The application layer 410 may include built-in applications and/or third-party applications. Examples of representative built-in applications may include, but are not limited to, a contacts application, a browser application, a book reader application, a location application, a media application, a messaging application, and/or a game application. Third-party applications may include any of the built-in applications as well as a broad assortment of other applications. In a specific example, the third-party application (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application may invoke application programming interface (API) calls provided by the operating system to facilitate functionality described herein. A software application 411 may implement the functionality of a pseudonymous browsing mode, in one embodiment. The pseudonymous browsing mode may be provided by a built-in or third-party application, which may include a user interface 412 and application elements 413 in various embodiments.

The applications in application layer 410 may utilize built in operating system functions (e.g., kernel, services and/or drivers), libraries, frameworks and middleware to create user interfaces to interact with users of the system. Alternatively, or additionally, in some systems interactions with a user may occur through a presentation layer. In these systems, the application/module "logic" may be separated from the aspects of the application/module that interact with a user.

Figure 5:
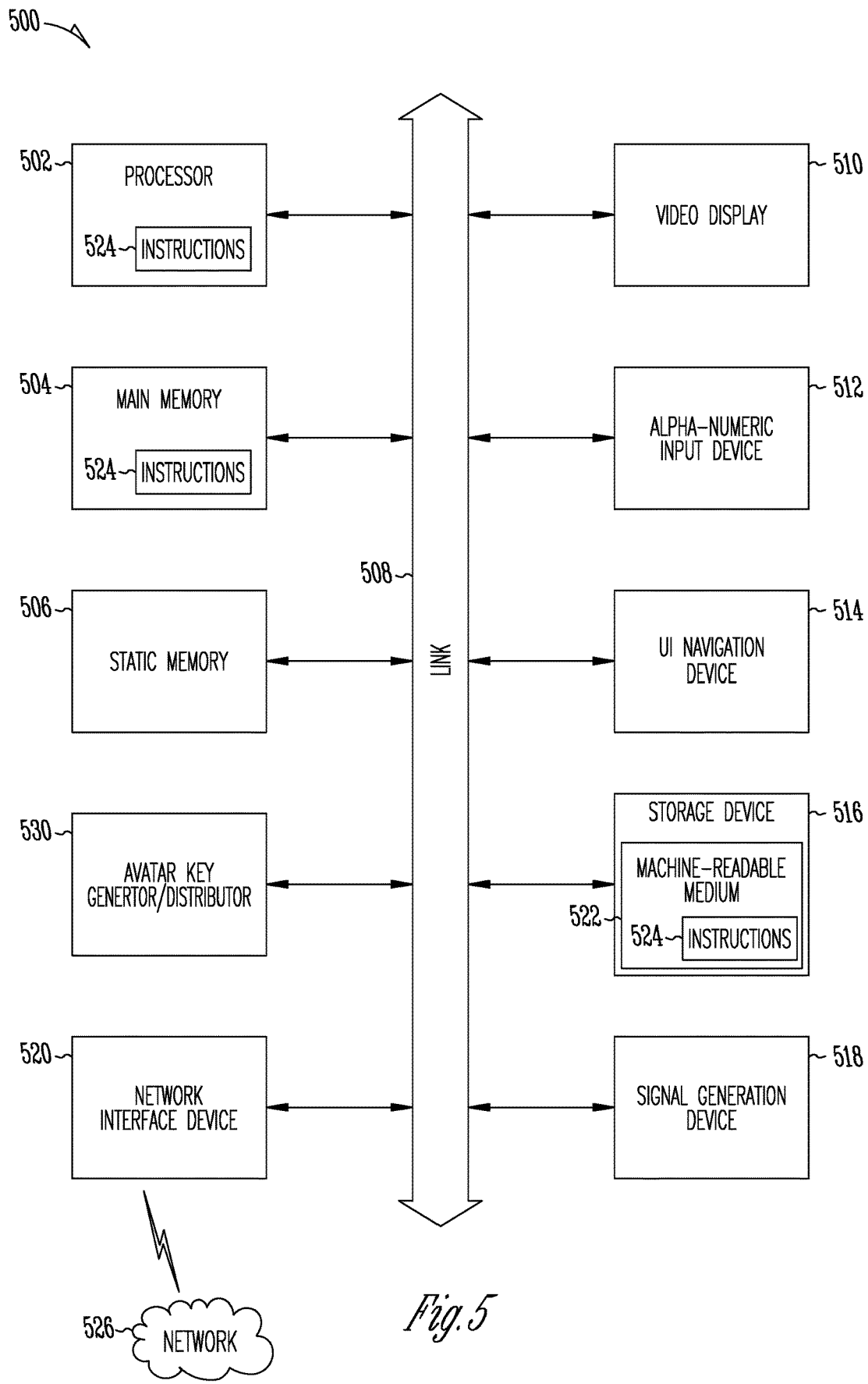
FIG. 5 is a block diagram of a machine in the example form of a computer system within which a set of instructions may be executed, for causing the machine to perform any one or more of the methodologies discussed herein.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a set-top box (STB), a personal digital assistant (PDA), a mobile or cellular telephone such as a smart phone, a wearable device such as a smart watch, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

In various embodiments, the system 500 includes a component 530 for avatar key generation and distribution. In some embodiments, as a user interacts with a browser session using an avatar, a unique avatar key is created and distributed by the component 530 to the user in parallel. The user may use the key and distribution cryptography to control and reuse the avatar, in various embodiments.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The data storage device 516 includes a machine-readable medium 522 on which is stored one or more sets of data structures and instructions 524 (e.g., software) embodying or utilized by any one or more of the methodologies or functions described herein. The instructions 524 may include a machine learning system or algorithm, and may also reside, completely or at least partially, within the main memory 504, static memory 506, and/or within the processor 502 during execution thereof by the computer system 500, with the main memory 504, static memory 506, and the processor 502 also constituting machine-readable media.

While the non-transitory computer-readable storage medium 522 is illustrated in an example embodiment to be a single medium, the term "machine-readable medium" or "computer-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone system (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
   receiving, by a processor of a computer, an input from a user requesting a level of anonymity for a session on an application or a website, wherein the level of anonymity is between open browsing and completely private browsing;
   programming, by the processor, an avatar configured to provide the level of anonymity to an identity of the user and data generated by the user based on the received input;
   storing, by the processor, the avatar in a local data store accessible to local applications and remote applications;
   determining, by the processor, that the user is attempting to access the application or the website;
   retrieving, by the processor, the avatar from the local data store based on the accessed application or the accessed website; and controlling, by the processor, an amount of data shared by the user with the application or the website using the avatar to provide the requested level of anonymity to an identity of the user and data generated by the user.

2. The method of claim 1, wherein programming the avatar includes programming a first avatar for a first application or a first website and programming a second avatar for a second application or a second website.

3. The method of claim 2, wherein the first avatar and the second avatar provide the same level of anonymity to the identity of the user and data generated by the user.

4. The method of claim 2, wherein the first avatar and the second avatar provide a different level of anonymity to the identity of the user and data generated by the user.

5. The method of claim 1, wherein programming an avatar includes programming a first avatar for a first session on a first application or a first website and programming a second avatar for a second session on the first application or the first website.

6. The method of claim 5, wherein the first avatar and the second avatar provide the same level of anonymity to the identity of the user and data generated by the user.

7. The method of claim 5, wherein the first avatar and the second avatar provide a different level of anonymity to the identity of the user and data generated by the user.

8. The method of claim 1, wherein the avatar provides for sharing or saving browsing history of the user, but not sharing or saving passwords or logins with the application or website.

9. The method of claim 1, wherein the avatar provides for not sharing or saving browsing history of the user, but sharing or saving passwords or logins with the application or website.

10. The method of claim 1, wherein the avatar provides for sharing or saving browsing history of the user, and sharing or saving passwords or logins with the application or website.

11. A system comprising:
a computing device comprising a processor and a data storage device in communication with the processor, wherein the data storage device comprises instructions thereon that, when executed by the processor; causes the processor to:
receive an input from a user requesting a level of anonymity for a session on an application or a website, wherein the level of anonymity is between open browsing and completely private browsing;
program an avatar configured to provide the level of anonymity to an identity of the user and data generated by the user based on the received input;
store the avatar in a local data store accessible to local applications and remote applications;
determine that the user is attempting to access the application or the website;
retrieve the avatar from the local data store based on the accessed application or the accessed website; and
control an amount of data shared by the user with the application or the website using the avatar to provide the requested level of anonymity to an identity of the user and data generated by the user.

12. The system of claim 11, wherein the avatar provides for sharing or saving browsing history of the user, but not sharing or saving passwords or logins with the application or website during the session.

13. The system of claim 11, wherein the avatar provides for not sharing or saving browsing history of the user, but sharing or saving passwords or logins with the application or website during the session.

14. The system of claim 11, wherein the avatar provides for sharing or saving browsing history of the user, and sharing or saving passwords or logins with the application or website during the session.

15. The system of claim 11, wherein the avatar provides for not sharing or saving browsing history of the user, and not sharing or saving passwords or logins with the application or website during the session.

16. A non-transitory computer-readable storage medium, the computer-readable storage medium including instructions that, when executed by computers, cause the computers to perform operations of:
receiving an input from a user requesting a level of anonymity for a session on an application or a website, wherein the level of anonymity is between open browsing and completely private browsing;
programming an avatar configured to provide the level of anonymity to an identity of the user and data generated by the user based on the received input;
storing the avatar in a local data store accessible to local applications and remote applications;
determining that the user is attempting to access the application or the website;
retrieving the avatar from the local data store based on the accessed application or the accessed website; and
controlling an amount of data shared by the user with the application or the website using the avatar to provide the requested level of anonymity to an identity of the user and data generated by the user.

17. The non-transitory computer-readable storage medium of claim 16, wherein the medium further includes instructions that, when executed by computers, cause the computers to perform operations of:
creating an avatar key associated with the avatar.

18. The non-transitory computer-readable storage medium of claim 17, wherein the medium further includes instructions that, when executed by computers, cause the computers to perform operations of:
distributing the avatar key associated with the avatar to the user.

19. The non-transitory computer-readable storage medium of claim 18, wherein the avatar key is configured to provide the user with control for modifying privacy settings of the avatar during the session.

20. The non-transitory computer-readable storage medium of claim 18, wherein the avatar key is configured to provide the user with control for reuse of the avatar during future sessions.

* * * * *

UNITED STATES PATENT AND TRADEMARK OFFICE
CERTIFICATE OF CORRECTION

| | |
|---|---|
| PATENT NO. | : 11,416,635 B1 |
| APPLICATION NO. | : 16/926220 |
| DATED | : August 16, 2022 |
| INVENTOR(S) | : Miranda et al. |

It is certified that error appears in the above-identified patent and that said Letters Patent is hereby corrected as shown below:

On the Title Page

In item (72), in "Inventors", in Column 1, Line 3, delete "Freemont," and insert --Fremont,-- therefor In the Claims In Column 9, Line 43, in Claim 11, delete "processor;" and insert --processor,-- therefor Signed and Sealed this
Eighteenth Day of October, 2022

*Katherine Kelly Vidal*

Katherine Kelly Vidal
*Director of the United States Patent and Trademark Office*